Patented Oct. 19, 1943

2,332,486

UNITED STATES PATENT OFFICE 2,332,486

ACYL COMPOUNDS OF POLYCYCLIC ALCOHOLS WITH GERMINAL GLAND HORMONE CHARACTERISTICS AND A METHOD FOR PRODUCING THE SAME

Friedrich Hildebrandt, Hohen Neuendorf, near Berlin, and Lothar Strassberger, Berlin-Wilmersdorf, Germany, assignors, by mesne assignments, to Schering Corporation, Bloomfield, N. J., a corporation of New Jersey No Drawing. Application February 19, 1936, Serial No. 64,678. In Germany February 23, 1935

16 Claims. (Cl. 260—397.5)

This invention relates to acyl compounds of polycyclic alcohols and more particularly to acyl compounds of the cyclopentano polyhydrophenanthrene series, having the characteristics of germinal gland hormones, and to a method of producing the same.

The process of the present invention consists in subjecting to the action of acylating agents such compounds of the cyclopentano polyhydrophenanthrene series as contain in their molecule a

group wherein X represents a hydrocarbon radical.

Said starting materials can be obtained, for instance, by causing compounds of the cyclopentano polyhydrophenanthrene series which contain a keto group in their molecule, to react with organo-metallic compounds, for example, according to the Grignard method with the aid of alkyl magnesium halogenides, and decomposing the reaction products by hydrolizing agents, for instance, with water and acids. Thus, follicle or testicle hormone compounds when caused to react in this way, yield compounds in which the CO-group present in these substances is transformed into a

group wherein X represents the hydrocarbon radical of the organo-metallic compound used. This process is described in the application of Friedrich Hildebrandt Ser. No. 748,664.

Now, in accordance with the present invention the acylation of these starting materials may take place, for example, by the action of acid chlorides, acid anhydrides or also the acids themselves in the presence or absence of catalysts as described, for example, in Houben-Weyl, Handbuch der organischen Arbeitsmethoden, 2nd edition, vol 2, page 481 et seq. As particularly suitable acylating agents have proved benzoyl chloride and acetic anhydride; however, other suitable acids can also be employed for the reaction.

If in addition to the

group another free hydroxy group or a group which has previously been acylated is present in the molecule of the starting material, diacyl compounds of the corresponding dialcohols may be produced whereby even mixed diacyl compounds may be obtained by using another acylating agent than previously employed.

One may also use such starting materials wherein the second hydroxy group instead of being free or acylated as aforesaid may have been transformed otherwise, for instance, by etherification, halogenation or the like, into a group which, on hydrolysis, is reconvertible into the hydroxy group. In this case a mono-acyl compound of the corresponding derivative of the starting material is formed by the process of the present invention.

In order to produce monoacyl compounds of the dialcohols, the starting material having both hydroxy groups free may be dissolved in a solvent wherein the monoacyl compound formed first is not soluble but is precipitated and, thus, withdrawn from the further attack of the acylating agent. One may also proceed in such a manner that the starting material is first acylated in a suitable solvent to the corresponding diacyl compound which then is partially saponified to the monoacylated product.

If the acylation compounds obtained according to the present invention contain carbon to carbon double bonds they may be subjected to the action of hydrogenating agents whereby the corresponding saturated or less unsaturated acylation compounds are formed. Of course, it is possible to carry out the acylation and hydrogenation treatment in any desired order so as to produce the same final product. The process of the present invention may be illustrated, for instance, by the following structural formulas wherein R represents an OH-group or a group that, on hydrolysis, is reconvertible into the OH-group, such as the O-acyl, O-alkyl, O-aryl group or halogen and the like, X a hydrocarbon radical and R' an OH-group or an O-acyl group at least one of the R and R' groups being an O-acyl group.

*a. Follicle hormone-like compounds*

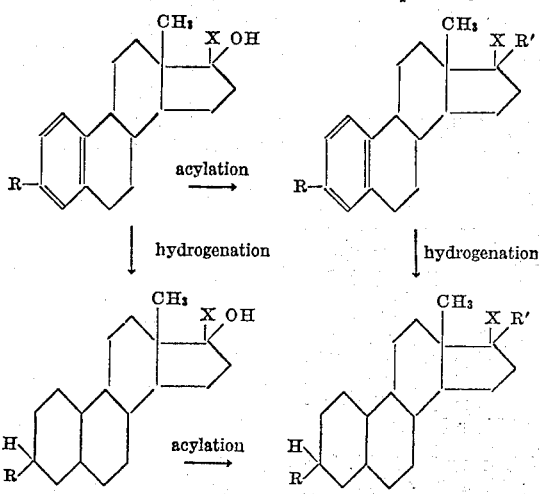

*b. Testicle hormone-like compounds*

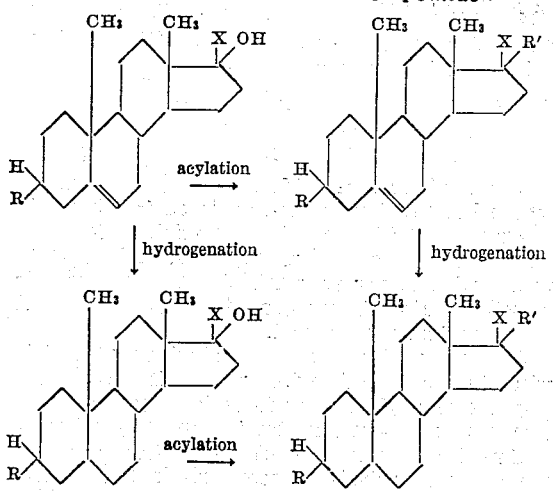

The new acylation products obtained according to the present invention are substances of high therapeutic value; they possess a remarkable physiological activity which is extended over a longer period of time than that of the starting material; in some cases also an increase of the activity can be observed. The acylation has proved of particular value in the case of those alcohols which are derived from the male germinal gland hormones and similar substances by the action of organo metallic compounds; in this case primarily the monobenzoates and acetates are of quite astonishing activity. Besides, the products obtained according to the present invention can serve as starting materials for the production of other valuable substances.

The invention claimed and described herein may further be illustrated by the following examples without, however, limiting the same to them:

Example 1

1 gram of 17-methyl-dihydrofollicle hormone is bonzoylated in the known manner according to Schotten-Baumann. By this means there is precipitated the difficulty soluble monobenzoylester of the formula $C_{26}H_{30}O_3$ which on account of isomerisation does not exhibit a sharp melting point.

Example 2

4 grams of 17-methyl-androstendiol-3.17 are dissolved in 200 ccs. of pyridine, treated with 50 ccs. of acetic anhydride and maintained for some time at a low temperature, for example, at 0° C. The whole is poured into water whereby the mono-acetyl compound is precipitated. It is filtered with suction, washed with dilute acid, then with water and recrystallised from dilute alcohol. Colorless needles of M. P. 174–175° are obtained.

Whereas in the case of androstenolone the capon unit amounts to 0.7 mg., in the case of the corresponding methyl-androstendiol, that is to say the starting material for this example it amounts to 0.23 mg. and in the case of the acetate obtained according to the above directions it falls to 0.12 mg. Accordingly an about 6-fold increase of the activity compared with the androstenolone is attained.

By careful hydrogenation of the unsaturated mono-acetyl compound obtained, for example, with catalytically activated hydrogen or the like it can be converted into the corresponding saturated mono-acetyl compound.

Example 3

5 grams of the substance obtained according to Example 2 are dissolved in 200 ccs. of pyridine, treated with 20 ccs. of benzoyl chloride and maintained for some time at room temperature. The working up takes place as in Example 2. The 3-acetal-17-methyl-17-benzoyl-androstendiol-3.17 is obtained. By partial saponification there can again be obtained therefrom the monobenzoyl compound.

The unsaturated compounds obtained according to the above example can also be converted into the corresponding saturated compounds when they are carefully hydrogenated until the double bond present in their molecule is saturated.

Example 4

5 grams of the 17-methyl-androstandiol-3.17 which melts at 173–175.5° C. are acetylated according to Example 2 at room temperature. There is obtained the 3-acetyl-17-methyl-androstandiol-3.17 which melts unsharply between 89 and 113° C.

While the activity of the 17-methyl-androstendiol-3.17 applied to the capon comb in a dose of 1 C. U. in 2 days ceases after 8–10 days, the acetate obtained according to the above example, on like application has a protracted action which extends to 5 weeks.

Also in the seminal vesicle test it proved considerably more active than the starting material. In experiments on castrated rats doses of 0.4 mg., 0.6 mg. and 3 mg. of 17-methyl-androstandiol-3.17 were administered daily for 3 weeks. The action on the seminal vesicles was as follows:

With 0.4 mg.: seminal vesicles slightly increased in size, slightly filled,
With 0.6 mg.: seminal vesicles distinctly increased in size, well filled,
With 3.0 mg.: seminal vesicles strongly increased in size, completely filled.

In the case of the acetate of the 17-methyl-androstandiol-3.17 the animals had only two injections weekly of 2 and 3 mg. each. The activity on the seminal vesicles was as follows:

After 2 weeks with 2 mg.: seminal vesicles strongly increased in size and well filled,
After 2 weeks with 3 mg.: seminal vesicles brought back to normal size and completely filled.

Thus, apart from the possibility of producing the desired action by a less frequent administration (twice weekly as compared with daily) there is observed in addition a considerably better effect.

Example 5

1 gram of 17-ethyl-trans-androstandiol-3.17 is benzoylated by interaction with benzoyl chloride in pyridine. The reaction product obtained likewise showed itself to be more active than the starting material.

Example 6

To a solution prepared from 1 gram of magnesium, 7 grams of methyl iodide and 50 ccs. of ether, a solution of 20 ccs. of ether containing 3 grams of androstenolone is added. The reaction mixture is kept boiling for an hour while stirring and a solution of 6 grams of benzoyl chloride in 20 ccs. of ether is added, the mixture being heated for another hour while stirring thoroughly. Then the whole is poured into water and taken up with ether; the ethereal solution is dried and the ether is evaporated off. The residue is dissolved in methyl alcohol and on evaporating the solution, the dibenzoyl-17-methyl-androstendiol-3.17 is obtained.

In this example the benzoyl chloride may be replaced, for instance, by benzoic acid anhydride.

Of course, various modifications and changes in the reaction conditions etc. may be made by those skilled in the art in accordance with the principles set forth herein and in the claims annexed hereto.

What we claim is:

1. Process for the production of acyl compounds of the cyclopentano polyhydrophenanthrene series, comprising subjecting to the action of acylating agents such nuclearly unsaturated compounds of the cyclopentano polyhydrophenanthrene series as contain in their molecule a

group in the 17-position wherein X represents a hydrocarbon radical.

2. Process according to claim 1, wherein as starting material a follicle hormone compound is employed which has in the place of the CO group a

group wherein X represents a hydrocarbon radical.

3. Process according to claim 1, wherein as starting material a follicle hormone compound is employed which has in place of the CO group a

group wherein X represents a methyl radical.

4. Process according to claim 1, wherein as starting material an androstene compound is employed which has in the place of the CO group a

group wherein X represents a hydrocarbon radical.

5. Process according to claim 1, wherein as starting material an androstene compound is employed which has in the place of the CO group a

group wherein X represents a methyl radical.

6. Process according to claim 1, wherein a starting material is employed having a second substituting group of the type which, on hydrolysis, can be converted into the hydroxy group.

7. Process according to claim 1, wherein an acylating agent is employed that effects an acetylation.

8. Process according to claim 1, wherein an acylating agent is employed that effects a benzoylation.

9. Process for the production of acyl compounds of the cyclopentano polyhydrophenanthrene series, comprising subjecting a 3-hydroxy cyclopentano polyhydrophenanthrene compound having a

group in the 17-position of the molecule, X representing a hydrocarbon radical, to the action of an acylating agent to convert said compound to the diacyl derivative, and then partially hydrolyzing the diacyl compound so obtained to the corresponding monoacyl compound.

10. Process according to claim 1 starting material is subjected to the action of acylating and hydrogenating agents in either order.

11. A compound having the structural formula

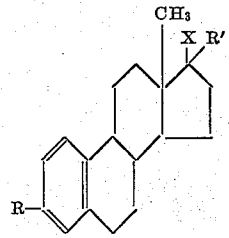

wherein R represents a member of the group consisting of OH and groups which on hydrolysis are converted into the OH group, X is a hydrocarbon radical and R' a member of the group consisting of OH and O-acyl, at least one of the groups R and R' being O-acyl.

12. A compound having the structural formula

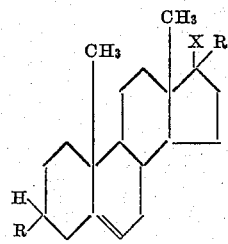

wherein R represents a member of the group consisting of OH and groups which on hydrolysis are converted into the OH group and including O-acyl, O-alkyl, O-aryl, and halogen, X is a hydrocarbon radical and R' a member of the group consisting of OH and O-acyl, at least one of the groups R and R' being O-acyl.

13. A compound having the structural formula

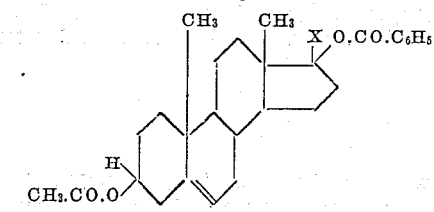

wherein X represents a hydrocarbon radical.

14. Process for the production of acyl compounds of the cyclopentano polyhydrophenanthrene series, comprising subjecting a nuclearly unsaturated 3-hydroxy-10,13-dimethyl cyclopentano polyhydrophenanthrene compound having a

group in the 17-position of the molecule, X representing a hydrocarbon radical, to the action of an acylating agent under such conditions that only the 3-OH group is acylated.

15. Process for the production of acyl compounds of the cyclopentano polyhydrophenanthrene series, comprising subjecting to the action of an acylating agent a nuclearly unsaturated compound of the cyclopentano polyhydrophenanthrene series having attached to the 3-carbon atom a group convertible with the aid of hydrolysis into an hydroxyl group and containing a

group in the 17-position wherein X represents a hydrocarbon radical.

16. Nuclearly unsaturated cyclopentano polyhydrophenanthrene compounds of the 13-methyl and 10,13-dimethyl series, having in the 3-position a group convertible with the aid of hydrolysis into an hydroxyl group and a $$C\begin{matrix}R\\X\end{matrix}$$

group in the 17-position, R being an O-acyl radical and X a hydrocarbon radical.

FRIEDRICH HILDEBRANDT.
LOTHAR STRASSBERGER.